United States Patent [19]

Aldrich

[11] 4,017,431

[45] Apr. 12, 1977

[54] AQUEOUS DISPERSIONS OF WAX BLENDS AND A WATER-SOLUBLE CATIONIC RESIN AND PAPER SIZED THEREWITH

[75] Inventor: Paul Harwood Aldrich, Greenville, Del.

[73] Assignee: Hercules Incorporated, Wilmington, Del.

[22] Filed: June 17, 1976

[21] Appl. No.: 697,008

Related U.S. Application Data

[63] Continuation-in-part of Ser. No. 420,191, Nov. 28, 1973, abandoned.

[52] U.S. Cl. .............................. 260/18 N; 162/158; 162/164 R; 162/172; 162/179; 260/18 R; 260/28 R
[51] Int. Cl.² ......................................... C08L 91/06
[58] Field of Search .......... 260/18 R, 18 N, 29.2 N, 260/28; 162/158, 164, 179, 172

[56] References Cited

UNITED STATES PATENTS

| | | | |
|---|---|---|---|
| 2,483,701 | 10/1949 | Hawley, Jr. et al. | 260/28 |
| 2,772,969 | 12/1956 | Reynolds, Jr. et al. | 162/179 |
| 2,926,116 | 2/1960 | Keim | 162/164 |
| 2,926,154 | 2/1960 | Keim | 162/164 |
| 2,961,367 | 11/1960 | Weisgerber | 162/158 |
| 3,006,806 | 10/1961 | Schur | 162/158 |
| 3,306,812 | 2/1967 | Sinclair et al. | 162/172 |
| 3,311,532 | 3/1967 | Kulick et al. | 162/179 |
| 3,483,077 | 12/1969 | Aldrich | 162/172 |
| 3,575,796 | 4/1971 | Brown et al. | 162/158 |
| 3,577,313 | 5/1971 | Bolger et al. | 162/164 |
| 3,700,623 | 10/1972 | Keim | 162/169 |

*Primary Examiner*—Eugene C. Rzucidlo
*Attorney, Agent, or Firm*—Charles L. Board

[57] ABSTRACT

Disclosed are essentially stable aqueous dispersions of wax--fatty acid blends, wax-ketene dimer blends, or mixtures thereof; a water-soluble cationic resin dispersing agent; and water. The dispersions are useful in the sizing of paper.

20 Claims, No Drawings

AQUEOUS DISPERSIONS OF WAX BLENDS AND A WATER-SOLUBLE CATIONIC RESIN AND PAPER SIZED THEREWITH

This application is a continuation in part of application Ser. No. 420,191, filed Nov. 28, 1973, now abandoned.

This invention relates to novel aqueous suspensions or dispersions which contain finely divided particles of a blend of wax and a fatty acid or a blend of wax and an alkyl ketene dimer. The novel aqueous suspensions are useful in the sizing of paper.

Aqueous dispersions of wax and their use in sizing paper are known in the art. Such aqueous suspensions consist essentially of water, finely divided wax particles, and a dispersing agent for the finely divided wax particles.

In accordance with this invention there are provided aqueous suspensions or dispersions of finely divided particles of a wax blend adapted for use in the sizing of paper which suspensions have excellent stability for prolonged periods of time.

The particles of the suspension will be either (1) a blend consisting essentially of, by weight, from about 99% to about 93% of a wax selected from the group consisting of petroleum waxes, synthetic hydrocarbon waxes, and mixtures thereof and from about 1% to about 7% of a $C_{18}$ to $C_{24}$ saturated fatty acid, or (2) a blend consisting essentially of, by weight, from about 99.5% to about 75% of a wax selected from the group consisting of petroleum waxes, synthetic hydrocarbon waxes, and mixtures thereof, and from about 0.5% to about 25% of at least one alkyl ketene dimer. If desired the suspension can be comprised of both particles (1) and particles (2).

Preferred blends are (1) a blend consisting essentially of, by weight, from about 99% to about 95% of a wax selected from the group consisting of petroleum waxes, synthetic hydrocarbon waxes, and mixtures thereof and from about 1% to about 5% of a $C_{18}$ to $C_{24}$ saturated fatty acid, and (2) a blend consisting essentially of, by weight, from about 99% to about 90% of a wax selected from the group consisting of petroleum waxes, synthetic hydrocarbon waxes, and mixtures thereof, and from about 1% to about 10% of at least one alkyl ketene dimer.

As used in the specification and in the claims the expression "blend", as applied to the particles of which the aqueous suspensions are comprised, means that (1) the wax and the fatty acid or (2) the wax and the alkyl ketene dimer are intimately and homogeneously mixed and united by dissolving one in the other. Dissolving one component in the other can be accomplished by fusing the two components together or by dissolving the two components together in a common solvent followed by solvent removal. See Example 26 for use of the common solvent. Thus, the particles of the wax-acid blend are not distinguishable, one from the other. Similarly, the wax and the ketene dimer are dissolved one in the other to provide a homogeneous blend and the particles are not distinguishable one from the other.

The aqueous suspensions will consist essentially of, by weight, (A) from about 5% to about 50% of finely divided particles as above described, (B) from about 0.5% to about 20% of a water-soluble cationic polymer that functions as dispersing agent, and (C) the balance water to 100%. Preferred suspensions will consist essentially of, by weight, (A) from about 5% to about 45% of finely divided particles, (B) from about 0.5% to about 10% of dispersing agent, and (C) the balance water to 100%.

The wax component of the blend is either a petroleum wax such as paraffin wax and microcrystalline wax or a synthetic hydrocarbon wax such as the polyethylene waxes. Suitable polyethylene waxes will have a molecular weight of from about 1500 to about 10,000 and a density of from about 0.91 to about 0.94.

The fatty acid component of the blend is a $C_{18}$–$C_{24}$ saturated fatty acid, examples of which include stearic acid, nonadecanoic acid, arachidic acid, heneicosanoic acid, behenic acid, tricosanoic acid, and tetracosanoic acid. The fatty acid component can consist of mixtures of two or more of the saturated acids. Up to about 50% of the $C_{18}$–$C_{24}$ saturated acid can be substituted with saturated $C_{14}$–$C_{16}$ fatty acids such as myristic acid, pentadecanoic acid and palmitic acid.

The alkyl ketene dimers which are used as components of the blend are dimers having the formula $[RCH=C=O]_2$ where R is an alkyl radical (saturated or unsaturated) having 10 to about 20 carbon atoms. In naming ketene dimers, the radical "R" is named followed by "ketene dimer". The decyl ketene dimer is $[C_{10}H_{21}-CH=C=O]_2$. Examples of ketene dimers include decyl, dodecyl, tetradecyl, hexadecyl, octadecyl, eicosyl, docosyl, and tetracosyl, as well as the ketene dimers prepared from palmitoleic acid, oleic acid, ricinoleic acid, linoleic acid, linolenic acid, myristoleic acid, and eleostearic acid. Mixtures of any of the above-named fatty acids with each other may also be used. A fatty acid fraction obtained from the fractional distillation of tall oil, which is predominantly oleic acid and linoleic acid, is an example of a fatty acid mixture.

The dispersing agents used to prepare the substantially stable aqueous dispersions or suspensions of this invention are cationic polymeric resinous materials that are water-soluble.

Particularly suitable dispersing agents are the cationic thermosettable water-soluble aminopolyamide—epichlorohydrin resins disclosed and described in U.S. Pat. Nos. 2,926,116 and 2,926,154. These resins are water-soluble polymeric reaction products of epichlorohydrin and an aminopolyamide. The aminopolyamide is derived by reaction of a dicarboxylic acid and a polyalkylenepolyamine in a mole ratio of polyalkylenepolyamine to dicarboxylic acid of from about 0.8:1 to about 14:1.

Particularly suitable dicarboxylic acids are diglycolic acid and saturated aliphatic dicarboxylic acids, containing from 3 through 10 carbon atoms such as malonic acid, succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed.

Polyalkylene polyamines are polyamines in which the nitrogen atoms are linked together by groups of the formula $-C_nH_{2n}-$ where $n$ is a small integer greater than unity and the number of such groups in the molecule ranges from two up to about eight. The nitrogen atoms can be attached to adjacent carbon atoms in the group $-C_nH_{2n}-$ or to carbon atoms farther apart, but not to the same carbon atom. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis-(3-aminopropyl)amine; methyl bis-(2-aminoethyl)amine; and 4,7-dimethyltriethylenetetramine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

Temperatures employed for carrying out reaction between the dicarboxylic acid and the polyalkylene polyamine can vary from about 110° C. to about 250° C. or higher at atmospheric pressure. For most purposes temperatures between about 160° C. and 210° C. are preferred. The time of reaction will usually vary from about ½ hours to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used. The aminopolyamide, derived as above described, is reacted with epichlorohydrin at a temperature of from about 45° C. to about 100° C., and preferably between about 45° C. and 70° C., until the viscosity of a 20% solids solution in water at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to about 50%.

In the aminopolyamide—epichlorohydrin reaction, satisfactory results can be obtained utilizing from about 0.1 mole to about 2 moles of epichlorohydrin for each secondary or tertiary amine group of the aminopolyamide, and preferably from about 1 mole to about 1.5 moles of epichlorohydrin.

A monofunctional alkylating agent can be employed as an additional reactant in carrying out the above reaction, if desired. A monofunctional alkylating agent can be first reacted with the aminopolyamide followed by reaction of the aminopolyamide-alkylating agent reaction product with epichlorohydrin, or the alkylating agent can be reacted with the aminopolyamide—epichlorohydrin reaction product. Thus, for example, epichlorohydrin can be added to an aqueous solution of the aminopolyamide at a temperature from about 45° C. to 55° C. The reaction mixture is then heated at a temperature from about 50° C. to 100° C., and preferably from about 60° C. to 80° C., depending upon the rate of reaction desired. After a suitable time at this temperature, i.e., from about 10–100 minutes, and preferably until the viscosity of an approximately 25% solids solution of the reaction mixture at 25° C. is from A to B on the Gardner-Holdt scale, at which time most of the epoxy groups of the epichlorohydrin have reacted with the amine groups of the aminopolyamide, a monofunctional alkylating agent is added and the reaction mixture heated, preferably at a temperature from about 60° C. to about 80° C., until the viscosity of an approximately 25% solids solution at 25° C. is at least A and preferably at least B to C on the Gardner-Holdt scale. The solids-viscosity relationship can be obtained by direct reaction at the 25% level followed by dilution to 25% solids, or reaction at a lower level followed by concentration at less than 40° C. and under reduced pressure to 25% solids. Lower alkyl esters of mineral acids such as the halides, sulfates and phosphates, substituted alkyl halides, and the like are suitable monofunctional alkylating agents. Illustrative of the compounds which can be used are dimethyl, diethyl and dipropyl sulfate; methyl chloride; methyl iodide; ethyl iodide; methyl bromide, propyl bromide; and the mono-, di- or tri-methyl, ethyl and propyl phosphates. Certain aromatic compounds such as benzyl chloride and methyl p-toluene sulfonate can be used. From about 0.1 mole to about 0.9 mole of monofunctional alkylating agent for each amine group can be used.

In the examples that follow, all parts and percentages are by weight unless otherwise specified. Sizing results are set forth in some of the examples. Sizing results are determined on the Hercules Sizing Tester. The sizing test determines the resistance of a sized sheet of paper to penetration by No. 2 Test Solution, (an aqueous solution of, by weight, 1.0% formic acid and 1.2% naphthol Green B). The time necessary for ink penetration to reduce light reflectance to 80% of the sheet's initial value is used to represent the degree of sizing.

The following example is illustrative of the preparation of an aminopolyamide—epichlorohydrin resin that is particularly useful as a cationic resin dispersing agent for use in this invention.

EXAMPLE 1

A aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170°–180° C. under a nitrogen blanket until amide formation is complete. After air cooling to approximately 140° C., hot water is added with stirring to provide a 50% solids solution of polyamide resin with an intrinsic viscosity of 0.140 measured by using a 2% solution in 1 N $NH_4Cl$. An epichlorohydrin derivative of the aminopolyamide is prepared by adding about 110.25 parts of water to about 50 parts of the 50% solids solution and then adding 14.4 parts (0.157 mole) of epichlorohydrin. The reaction mixture is heated at 70° C. with stirring under a reflux condenser until the Gardner-Holdt viscosity attains a value of E to F. The reaction mixture is diluted with water to a solids content of about 12.5%.

Other suitable dispersing agents that can be used in this invention are the water-soluble alkylene polyamine—epichlorohydrin resins which are water-soluble polymeric reaction products of epichlorohydrin and an alkylene polyamine.

Alkylene polyamines which can be reacted with epichlorohydrin have the formula $H_2N(C_nH_{2n}NH)_xH$ wherein $n$ is an integer 2 through 8 and $x$ is an integer 1 or more, preferably 1 through 6. Examples of such alkylene polyamines are the alkylene diamines such as ethylenediamine; propylene diamine-1,2; propylene diamine-1,3; tetramethylenediamine; and hexamethylenediamine. The polyalkylene polyamines such as the polyethylene polyamines, polypropylene polyamines, polybutylene polyamines and the like are examples of alkylene polyamines that can be used. Specific examples of these polyalkylene polyamines include diethylenetriamine, triethylenetetramine, tetraethylenepentamine, and dipropylenetriamine. Other polyalkylene polyamines that can be used include methyl bis(3-aminopropyl)amine; methyl bis(2-aminoethyl)amine; and 4,7-dimethyltriethylenetetramine. Mixtures of alkylene polyamines can be used if desired.

The relative proportions of alkylene polyamine and epichlorohydrin employed can be varied depending upon the particular alkylene polyamine used. In general, it is preferred that the molar ratio of epichlorohydrin to alkylene polyamine be in excess of 1:1 and less than 2:1. In the preparation of a water-soluble resin from epichlorohydrin and tetraethylenepentamine, good results are obtained at molar ratios of from about 1.4:1 to 1.94:1. Reaction temperature is preferably in the range of from about 40° C. to about 60° C.

The following example illustrates the preparation of a dispersing agent of the above type.

EXAMPLE A

To a mixture of 29.2 parts triethylenetetramine and 70 parts water is added 44.4 parts epichlorohydrin over a period of about 12 minutes with periodic cooling. After the epichlorohydrin addition is complete, the reaction mixture is heated to 75° C. and maintained at a temperature of from about 70° C. to about 77° C. for about 33 minutes, at which point the Gardner-Holdt viscosity reached about I. The resulting reaction mass is diluted with 592 parts water to provide an aqueous solution that has a solids content of about 11.7% and a pH of about 6.3.

Another suitable dispersing agent for use in this invention is a poly(diallylamine)—epihalohydrin resin. Resins of this type can be prepared in accordance with the teachings of U.S. Pat. No. 3,700,623, reference to which is hereby made.

A poly(diallylamine)—epihalohydrin resin is the resinous reaction product of (A) a linear polymer having units of the formula

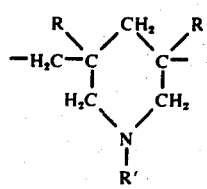

where R is hydrogen or lower alkyl and R' is hydrogen, alkyl or a substituted alkyl group and (B) an epihalohydrin.

In the above formula, each R can be the same or different and, as stated, can be hydrogen or lower alkyl. The alkyl groups contain from 1 to 6 carbons and are preferably methyl, ethyl, isopropyl or n-butyl. R' of the formula represents hydrogen, alkyl or substituted alkyl groups. The R' alkyl groups will contain from 1 to 18 carbon atoms (preferably from 1 to 6 carbon atoms) such as methyl, ethyl, propyl, isopropyl, butyl, tert-butyl, hexyl, octyl, decyl, dodecyl, tetradecyl, and octadecyl. R' can also be a substituted alkyl group. Suitable substituents include, in general, any group which will not interfere with polymerization through a vinyl double bond. Typically, the substituents can be carboxylate, cyano, ether, amino (primary, secondary or tertiary), amide, hydrazide and hydroxyl.

Polymers having units of the above formula can be produced by polymerizing the hydrohalide salt of a diallylamine

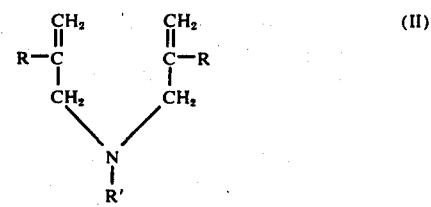

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride; N-methyldiallylamine hydrochloride; N-methyldiallylamine hydrobromide; 2,2'dimethyl-N-methyldiallylamine hydrochloride; N-ethyldiallylamine hydrobromide; N-isopropyldiallylamine hydrochloride; N-n-butyldiallylamine hydrobromide; N-tert-butyldiallylamine hydrochloride; N-n-hexyldiallylamine hydrochloride; N-octadecyldiallylamine hydrochloride; N-acetamidodiallylamine hydrochloride; N-cyanomethyldiallylamine hydrochloride; N-β-propionamidodiallylamine hydrobromide; N-carboethoxymethyldiallylamine hydrochloride; N-β-methoxyethyldiallylamine hydrobromide; N-β-aminoethyldiallylamine hydrochloride; N-hydroxyethyldiallylamine hydrobromide; and N-acetohydrazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N-methyldiallylamine can be prepared by reaction of two moles of an allyl halide, such as allyl chloride, with one mole of methylamine in the presence of an ionization catalyst such as one of those enumerated above.

In preparing the homopolymers and copolymers, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperature. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin can contain different units of formula (I) and/or contain units of one or more other copolymerizable monomers. Typically, the comonomer is a different diallylamine, a monoethylenically unsaturated compound containing a single vinyl or vinylidene group or sulfur dioxide, and is present in an amount ranging from 0 to 95 mole % of the polymer. Thus the polymers of diallylamine are linear polymers wherein from 5% to 100% of the recurring units have the formula (I) and from 0 to 95% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The poly(diallylamine)—epihalohydrin resin can be prepared by reacting a homopolymer or copolymer of a diallylamine as set forth above with an epihalohydrin at a temperature of from about 30° C. to about 80° C. and preferably from about 40° C. to about 60° C. until the viscosity measured on a solution containing 20% to 30% solids at 25° C. has reached a range of A to E and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25° C.).

The poly(diallylamine)—epihalohydrin resin can be stabilized against gelation by adding to the aqueous solution thereof sufficient water-soluble acid (such as hydrochloric acid and sulfuric acid) to obtain and maintain the pH at about 2.

The following example illustrates the preparation of a poly(diallylamine)—epichlorohydrin resin.

EXAMPLE B

A solution of 69.1 parts of methyldiallylamine and 197 parts of 20° Be hydrochloric acid in 111.7 parts of demineralized water is sparged with nitrogen to remove air, then treated with 0.55 part of tertiary butyl hydroperoxide and a solution of 0.0036 part of ferrous sulfate in 0.5 part of water. The resulting solution is allowed to polymerize at 60°–69° C. for 24 hours to give a polymer solution containing about 52.1% solids with an RSV of 0.22. 122 Parts of the above solution is adjusted to pH 8.5 by the addition of 95 parts of 3.8% sodium hydroxide and then diluted with 211 parts of water and combined with 60 parts of epichlorohydrin. The mixture is heated at 45°–55° C. for 1.35 hours until the Gardner-Holdt viscosity of a sample cooled to 25° C. reaches B+. The resulting solution is acidified with 25 parts of 20° Be hydrochloric acid and heated at 60° C. until the pH becomes constant at 2.0. The resulting resin solution has a solids content of 20.8% and a Brookfield viscosity = 77 cp. (measured using a Brookfield Model LVF Viscometer, No. 1 spindle at 60 r.p.m with guard).

Examples 2, 3, and 4 below are illustrative of suspensions of unblended wax particles.

EXAMPLE 2

Three hundred twenty parts of a 12.5% solids solution of an aminopolyamide—epichlorohydrin resin prepared in accordance with Example 1 and 440 parts water are mixed and heated quickly to 90° C. and added to the supply tank of a Manton-Gaulin laboratory (15 gal. per hour) homogenizer. Two hundred forty parts of fused refined paraffin wax (m.p. 140°–145° F.) is added to the hot solution in the supply tank with mixing by means of a propeller type stirrer. Before addition of the aqueous resin solution to the supply tank, the homogenizer is preheated by circulating water at about 85° C. through the body of the homogenizer and back to the supply tank where the water is heated by blowing steam through a stainless steel coil brazed onto the outside of the tank. The mixture is homogenized with two passes through the homogenizer at 3000 psi. The homogenized product is collected in a glass bottle and cooled to room temperature by placing the bottle in a cold water bath with stirring of the product during cooling. The product is a blue-white aqueous dispersion with 28% total solids (24% wax and 4% aminopolyamide—epichlorohydrin resin). After standing 24 hours, a small amount of undispersed wax present in the dispersion is separated by filtration through a 100 mesh screen. This is collected, dried, and weighed to measure the percentage of the added wax which separates under these conditions. Longer term stability is measured by allowing about 235 parts of the filtered dispersion to stand about four weeks when it is filtered a second time through a 100 mesh screen. The separated wax is dried and weighed. Wax separation results are set forth in Table I below.

EXAMPLE 3

Example 2 is repeated. Wax separation results are set forth in Table I below.

EXAMPLE 4

Example 2 is repeated. Wax separation results are set forth in Table I below.

TABLE I

| Example | % Wax Separated (24 Hours) | Parts Wax From 235 Parts of Filtered Dispersion After 4 Weeks Standing |
|---|---|---|
| 2 | 3.9 | .13 |
| 3 | 2.8 | .05 |
| 4 | 1.0 | .01 |

Examples 5–7 below are illustrative of the suspensions of this invention.

EXAMPLES 5–7

Examples 2, 3 and 4 are repeated using the same starting materials with the exception that, instead of the 240 parts of fused wax, there is added to the hot solution in the supply tank, in the fused state, a blend of 9.6 parts hydrogenated tallow fatty acids and 230.4 parts refined paraffin wax prepared by melting the two components together. Solid (blend of the wax and fatty acid) separation results are set forth in Table II below.

TABLE II

| Example | Solids Separated (24 Hours) | Parts Solids From 235 Parts of Filtered Dispersion After 4 Weeks Standing |
|---|---|---|
| 5 | 0.2 | None |
| 6 | 0.1 | None |
| 7 | 0.1 | None |

Example 8 shows sizing properties of the dispersions of Example 2–7.

EXAMPLE 8

The dispersions of Examples 2–7 are applied to 40 lb./3000 ft.² bleached kraft waterleaf paper in a size press in an amount sufficient to provide 0.38% (dispersion solids) based on the weight of the paper and the thus-treated paper drum dried. Sizing test results are as follows:

| Example | Hercules Sizing Test, Seconds |
|---|---|
| 2 | 234 |
| 3 | 270 |
| 4 | 259 |
| 5 | 251 |
| 6 | 253 |
| 7 | 230 |

EXAMPLE 9

Example 2 is repeated. Solids (wax) separation results are set forth in Table III below.

EXAMPLES 10–15

Example 2 is repeated using varying amounts of commercial docosanoic acid (a mixture of saturated fatty acids containing about 27% stearic acid, 12% eicosanoic acid, 56% docosanoic acid and small amounts of other fatty acids) in place of part of the wax. Prior to addition to the hot solution in the supply tank the wax and acid are blended together by melting the two together. The blend is added in the fused state. In these examples, the second filtrations are made five weeks after the first. Solids (wax-fatty acids blend) separation results are set forth in Table III below.

TABLE III

| Example | Parts Docosanoic Acid | Parts Wax | % Solids Separated (24 Hours) | Parts Solids From 235 Parts of Filtered Dispersion After 5 Weeks Standing |
|---|---|---|---|---|
| 9 (Control) | 0 | 240 | .33 | .63 |
| 10 | 1.2 | 238.8 | .05 | .00 |
| 11 | 2.4 | 237.6 | .08 | .00 |
| 12 | 4.8 | 235.2 | .04 | .00 |
| 13 | 9.6 | 230.4 | .00 | .00 |
| 14 | 16.9 | 223.1 | .06 | .01 |
| 15 | 24.0 | 216.0 | 100 | — |

Example 16 shows sizing properties of the dispersions of Examples 9–14.

EXAMPLE 16

The dispersions of Examples 9 through 14 are applied to 40 lb./3000 ft.² bleached kraft waterleaf in a size press in an amount sufficient to provide 0.38% (dispersion solids) based on the weight of paper and the thus-treated paper drum dried. Sizing test results are as follows:

| Example | Hercules Sizing Test Seconds |
|---|---|
| 9 | 174 |
| 10 | 200 |
| 11 | 204 |
| 12 | 218 |
| 13 | 247 |
| 14 | 305 |

EXAMPLE 17

Example 9 is repeated. Solids (wax) separation results are set forth in Table IV below.

EXAMPLES 18–23

Examples 10–15 are repeated using an alkyl ketene dimer made from tall oil fatty acids in place of commercial docosanoic acid. In these examples, the second filtrations are made two weeks after the first. Solids (wax-ketene dimer blends) separation results are set forth in Table IV below:

TABLE IV

| Example | Parts Ketene Dimer | Parts Wax | % Solids Separated 24 Hours | Parts Solids From 235 Parts of Filtered Dispersion After 2 Weeks Standing |
|---|---|---|---|---|
| 17 (Control) | 0 | 240 | .98 | .05 |
| 18 | 1.2 | 238.8 | .14 | .02 |
| 19 | 2.4 | 237.6 | .14 | .06 |
| 20 | 4.8 | 235.2 | .08 | .00 |
| 21 | 9.6 | 230.4 | .03 | .00 |
| 22 | 16.9 | 223.1 | .02 | .00 |
| 23 | 24.0 | 216.0 | .02 | .00 |

Example 24 shows sizing properties of the dispersions of Examples 17–23.

EXAMPLE 24

The dispersions of Examples 17–23 are applied to 40 lb./3000 ft.$^2$ bleached kraft waterleaf in a size press in an amount sufficient to provide 0.38% (dispersion solids) based on the weight of paper and the thus-treated paper drum dried. Sizing results are as follows:

| Example | Hercules Sizing Test Seconds |
|---|---|
| 17 | 162 |
| 18 | 154 |
| 19 | 139 |
| 20 | 151 |
| 21 | 245 |
| 22 | 384 |
| 23 | 473 |

Example 25 is a control to be compared with Example 26 which is an example of applicant's invention.

EXAMPLE 25

Three hundred parts polyethylene wax having a mol. wt. 2200, a ring and ball softening point 108° C., and a density 0.921 (Epolene 11) is dissolved in 300 parts xylene by heating to about 95° C. To this solution is added a hot (about 90° C.) mixture of 400 parts of aminopolyamide—pichlorohydrin resin prepared as in Example 1 with 1060 parts water. The hot premix is homogenized twice at 3000 psi in a homogenizer preheated to about 95° C. The resulting product is a stable oil-in-water emulsion from which substantially all of the xylene is removed by distillation at atmospheric pressure during which the product temperature increases from about 94° C. to about 100° C. The solids content of the resulting stable aqueous suspension is about 25%. After cooling to room temperature, the mixture is filtered through a 100 mesh screen to separate the undispersed wax. The dried undispersed wax represents about 2.6% of the wax in the dispersion.

EXAMPLE 26

Example 25 is repeated using 3 parts stearic acid to replace 3 parts of the polyethylene wax in the xylene solution. In this case, less than 0.1% of the dispersed wax is collected when the final product is filtered through a 100 mesh screen.

Example 27 illustrates the preparation of a dispersing agent for use in this invention, the dispersing agent being a watersoluble poly(diallylamine)—epichlorohydrin resin.

EXAMPLE 27

To 250 parts of methyldiallylamine is added slowly 230 parts 37% hydrochloric acid in about 240 parts demineralized water. The mixture is cooled as needed to prevent volatilization of materials due to the heat of reaction. The pH of the resulting mixture is then adjusted to 3.1 by additional (19 parts) methyldiallylamine. After the oxygen in the reaction vessel is displaced with nitrogen, 2.2 parts t-butyl hydroperoxide is added. This is followed by 0.0014 part ferrous sulfate hepta hydrate in 1.1 parts demineralized water. When the reaction mixture is warmed to 60° C., there is a mild exothermic reaction which carries the reaction temperature briefly to about 66°–70° C. For the remainder of the 24-hour reaction time, the temperature is held at about 60° C. After cooling to 25°–30° C., the total solids of the product is about 48.4% and the RSV is .21 cp. To 220 parts of the above polymer solution is added sufficient (about 160 parts) sodium hydroxide solution (10 parts sodium hydroxide in 376 parts water) to adjust the pH to about 8.5. The neutralized polymer solution is diluted with 366 parts demineralized water and then heated to about 40° C. To the warm solution is added 106 parts epichlorohydrin and the reaction warmed further to react the epichlorohydrin at about 50°–55° C. Reaction is continued until the reaction mixture reaches a Gardner viscosity of about B+ (about 1.7 hours). At this time the reaction is quenched by the rapid addition of about 35 parts 37% hydrochloric acid to give a final pH of about 2. There is obtained 859 parts of a product containing about 20.7% total solids. A series of runs are made substantially as described above to give a total of about 7395 parts of product with about 20.4% total solids.

Example 28 uses as a dispersing agent the resin of Example 27 and is a control for comparison with Examples 29–33.

EXAMPLE 28

Two hundred and seven (207) parts of a 20.4% solids solution of an epichlorohydrin modified tertiary amino polymer prepared in accordance with Example 27 and 473 parts water are mixed and heated quickly to 90° C. and added to the supply tank of a Manton-Gaulin laboratory (15 gal. per hour) homogenizer. Two hundred forty parts of fused refined paraffin wax (m.p. 140°–145° F.) is added to the hot solution in the supply tank with mixing by means of a propeller type stirrer. Before addition of the aqueous resin solution to the supply tank, the homogenizer is preheated by circulating water at about 85° C. through the body of the homogenizer and back to the supply tank where the water is heated by blowing steam through a stainless steel coil brazed onto the outside of the tank. The mixture is homogenized with two passes through the homogenizer at 3000 psi. The homogenized product is collected in a glass bottle and cooled to room temperature by placing the bottle in a cold water bath with stirring of the product during cooling. The product is a blue-white aqueous dispersion with 28% total solids, 24% wax and 4% poly(diallylamine)—epichlorohydrin resin. After standing 24 hours, a small amount of undispersed wax present in the dispersion is separated by filtration through a 100 mesh screen. This is collected, dried, and weighed to measure the percentage of the added wax which separates under these conditions. Longer term stability is measured by allowing about 235 parts of the filtered dispersion to stand for about 4 weeks when it is filtered a second time through a 100 mesh screen. The separated wax is dried and weighed. Results are given in Table V below.

EXAMPLES 29–33

Example 28 is duplicated with the exception that varying amounts of wax are replaced by an alkyl ketene dimer made from commercial stearic acid. The wax and the alkyl ketene dimer are first fused together to provide a homogeneous blend which is added, in the fused form, to the hot solution in the supply tank. Solids (wax-ketene dimer blend) separation results are set forth in Table V below.

TABLE V

| Example | Parts Ketene Dimer | Parts Wax | % Solids Separated (24 Hours) | Parts Solid From 235 Parts of Filtered Dispersion After 4 Weeks Standing |
|---|---|---|---|---|
| 28 (Control) | 0 | 240 | 16.4 | .58 |
| 29 | 2.4 | 237.6 | 6.6 | .15 |
| 30 | 4.8 | 235.2 | 6.7 | .18 |
| 31 | 9.6 | 230.4 | 3.5 | .03 |
| 32 | 16.9 | 223.1 | 4.0 | 1.82 |
| 33 | 24.0 | 216.0 | 0.25 | 2.19 |

EXAMPLE 34

The dispersions of Examples 28–33 are applied to 40 lb./3000 ft.² bleached kraft waterleaf in a size press in an amount sufficient to provide 0.38% (dispersion solids) based on the weight of paper the thus-treated paper drum dried. Sizing results are as follows:

| Example | Hercules Sizing Test Seconds |
|---|---|
| 28 | 212 |
| 29 | 303 |
| 30 | 336 |
| 31 | 510 |
| 32 | 676 |
| 33 | 842 |

Example 35 illustrates the preparation of a dispersing agent for use in this invention, the dispersing agent being a water-soluble alkylenepolyamine—pichlorohydrin resin.

EXAMPLE 35

A reaction vessel is charged with 704 parts water and 476 parts epichlorohydrin. A steam jet vacuum system is turned on to exhaust vapors through a condenser and to prevent them from escaping through the open manhole. Four hundred twenty parts of Amine 248 is added with agitation in 35 minutes while the temperature is allowed to rise to 70° C. Cooling water is required to limit the temperature rise to 70° C. After amine addition is complete, the reactor charge has a pH of 7.8 and an A viscosity by Gardner Holdt. Six parts of 20% NaOH is added to speed reaction. After 2 hours and 40 minutes at about 70° C., the viscosity reaches a U+ viscosity and the resin solution is diluted with 640 parts water which reduces the viscosity to about C–. A total of 44 parts of 20% NaOH is added in four separate additions during 1-¾ hour period to speed reaction. An S viscosity is reached after 3 hours and 35 minutes, and the reaction is killed and diluted with 26 parts concentrated sulfuric acid in 1345 parts water. This gives an aqueous solution of 23.3% total solids, a D viscosity, and a pH of 4.4. Further addition of $H_2SO_4$ and water gives 22.5% total solids, (113 cp. visc.) and 4.0 pH. The resin solution is filtered through 100 μfilter cartridges to give a total of 3336 parts of product. Amine 248 is a dark, viscous liquid or paste with a slight ammoniacal odor. At least 75% of Amine 248 consists of bis(hexamethylene)-triamine and higher homologues:

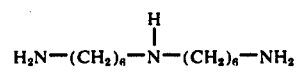

bis-(hexamethylene)-triamine
and

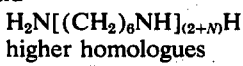

higher homologues
The remainder consists of lower molecular weight amines, nitriles and lactams.

Example 36 uses as a dispersing agent the resin of Example 35 and is a control for comparison with Examples 37–42.

EXAMPLE 36

One hundred seventy four (174) parts of a 22.5% solids solution of an alkylenepolyamine-epichlorohydrin reaction product prepared in accordance with Example 35 and 506 parts water are mixed and heated quickly to 90° C. and added to the supply tank of a Manton-Gaulin laboratory (15 gal. per hour) homogenizer. Two hundred forty parts of fused refined paraffin wax (m.p. 140°–145° F.) is added to the hot solution in the supply tank with mixing by means of a propeller type stirrer. Before addition of the aqueous resin solution to the supply tank, the homogenizer is preheated by circulating water at about 85° C. through the body of the homogenizer and back to the supply tank where the water is heated by blowing steam strough a stainless steel coil brazed onto the outside of the tank. The mixture is homogenized with two passes through the homogenizer at 3000 psi. The homogenized product is collected in a glass bottle and cooled to room temperature by placing the bottle in a cold water bath with stirring of the product during cooling. The product is a blue-white aqueous dispersion with 28% total solids, 24% wax and 4% alkylenepolyamine—epichlorohydrin resin. After standing 24 hours, a small amount of undispersed wax present in the dispersion is separated by filtration through a 100 mesh screen. This is collected, dried and weighed to measure the percentage of the added wax which separates under these conditions. Longer term stability is measured by allowing about 235 parts of the filtered dispersion to stand for about two weeks when it is filtered a second time through a 100 mesh screen. The separated wax is dried and weighed. Results are shown in Table VI below.

EXAMPLES 37–42

Example 36 is repeated using varying amounts of fatty acids (as indicated in Table VI below) to replace part of the paraffin wax. The wax and fatty acids are first fused together to provide a homogeneous blend thereof which blend is added, in the fused state, to the hot solution in the supply tank. The fatty acids are the same as used in Examples 5–7. Solids separation results are set forth in Table VI below.

TABLE VI

| Example | Parts Fatty Acids | Parts Wax | % Solids Separated (24 Hours) | Parts Solids From 235 Parts Filtered Dispersion After 2 Weeks Standing |
|---|---|---|---|---|
| 36 (Control) | 0 | 240 | .86 | .00 |
| 37 | 1.2 | 238.8 | .63 | .00 |
| 38 | 2.4 | 237.6 | .57 | .00 |
| 39 | 4.8 | 235.2 | .47 | .00 |
| 40 | 9.6 | 231.4 | .10 | .00 |
| 41 | 16.9 | 223.1 | .13 | .00 |
| 42 | 24.0 | 216.0 | .15 | .00 |

The dispersions of Examples 37–42 can be satisfactorily employed in the manufacture of sized paper.

Commercially available saturated fatty acids will often contain small amounts of unsaturated fatty acids. These fatty acids can be employed in preparing the blends used in this invention provided the unsaturated content does not exceed about 10% by weight.

It is to be understood that the above description and working examples are illustrative of this invention and not in limitation thereof.

What I claim and desire to protect by Letters Patent is:

1. An aqueous dispersion of finely divided solid particles consisting essentially of, by weight
   A. from about 5% to about 50% of finely divided solid particles, said solid particles being selected from the group consisting of
      1. a blend consisting essentially of, by weight, from about 99% to about 93% of a wax selected from the group consisting of petroleum waxes, synthetic hydrocarbon waxes, and mixtures thereof and from about 1% to about 7% of a $C_{18}$ to $C_{24}$ saturated fatty acid,
      2. a blend consisting essentially of, by weight, from about 99.5% to about 75% of a wax selected from the group consisting of petroleum waxes, synthetic hydrocarbon waxes, and mixtures thereof and from about 0.5% to about 25% of at least one alkyl ketene dimer having the formula $[RCH=C=O]_2$ where R is an alkyl radical having 10 to about 20 carbon atoms, and
      3. mixtures of (1) and (2),
   B. from about 0.5% to about 20% of water-soluble cationic resin dispersing agent selected from the group consisting of
      i. a water-soluble polyaminopolyamide—epichlorohydrin resin,
      ii. a water-soluble alkylenepolyamine—epichlorohydrin resin,
      iii. a water-soluble poly(diallylamine)—epichlorohydrin resin, and
      iv. mixtures of any two or more of (i), (ii), and (iii), and
   C. water to 100%.

2. An aqueous dispersion of finely divided solid particles consisting essentially of, by weight
   A. from about 5% to about 45% of finely divided solid particles, said solid particles being selected from the group consisting of
      (1) a blend consisting essentially of, by weight, from about 99% to about 94% of a wax selected from the group consisting of petroleum waxes, synthetic hydrocarbon waxes, and mixtures thereof and from about 1% to about 5% of a $C_{18}$ to $C_{24}$ saturated fatty acid,
      (2) a blend consisting essentially of, by weight, from about 99% to about 90% of a wax selected from the group consisting of petroleum waxes, synthetic hydrocarbon waxes, and mixtures thereof and from about 1% to about 10% of at least one alkyl ketene dimer having the formula $[RCH=C=O]_2$ where R is an alkyl radical having 10 to about 20 carbon atoms, and
      (3) mixtures of (1) and (2),
   B. from about 0.5% to about 10% of water-soluble cationic resin dispersing agent selected from the group consisting of
      i. a water-soluble polyaminopolyamide—epichlorohydrin resin,
      ii. a water-soluble alkylenepolyamine—epichlorohydrin resin,
      iii. a water-soluble poly(diallylamine)—epichlorohydrin resin, and
      iv. mixtures of any two or more of (i), (ii), and (iii), and
   C. water to 100%.

3. The dispersion of claim 2 wherein (A) is blend (1).
4. The dispersion of claim 2 wherein (A) is blend (2).
5. The dispersion of claim 3 wherein (B) is (i).
6. The dispersion of claim 3 wherein (B) is (ii).
7. The dispersion of claim 3 wherein (B) is (iii).
8. The dispersion of claim 4 wherein (B) is (i).
9. The dispersion of claim 4 wherein (B) is (ii).
10. The dispersion of claim 4 wherein (B) is (iii).
11. Paper sized by use of the dispersion of claim 1.
12. Paper sized by use of the dispersion of claim 2.
13. Paper sized by use of the dispersion of claim 3.
14. Paper sized by use of the dispersion of claim 4.
15. Paper sized by use of the dispersion of claim 5.
16. Paper sized by use of the dispersion of claim 6.
17. Paper sized by use of the dispersion of claim 7.
18. Paper sized by use of the dispersion of claim 8.
19. Paper sized by use of the dispersion of claim 9.
20. Paper sized by use of the dispersion of claim 10.

* * * * *